US012438933B2

(12) United States Patent
Jeon

(10) Patent No.: US 12,438,933 B2
(45) Date of Patent: Oct. 7, 2025

(54) METHOD AND DEVICE FOR PROVIDING ADVERTISEMENT BY COUNTERACTING ON VIOLENT ADVERTISEMENT BLOCKING FUNCTION

(71) Applicant: Adshield, Inc., Seoul (KR)

(72) Inventor: Sang Hyeon Jeon, Seoul (KR)

(73) Assignee: Adshield, Inc., Seoul (KR)

( * ) Notice: Subject to any disclaimer, the term of this patent is extended or adjusted under 35 U.S.C. 154(b) by 197 days.

(21) Appl. No.: 17/836,540

(22) Filed: Jun. 9, 2022

(65) Prior Publication Data
US 2023/0262107 A1  Aug. 17, 2023

(30) Foreign Application Priority Data

Feb. 14, 2022 (KR) .................. 10-2022-0018831
Feb. 14, 2022 (KR) .................. 10-2022-0018834
Feb. 14, 2022 (KR) .................. 10-2022-0018838

(51) Int. Cl.
*H04L 67/02* (2022.01)
*G06Q 30/0241* (2023.01)
*H04L 9/40* (2022.01)
*H04L 67/00* (2022.01)

(52) U.S. Cl.
CPC ......... *H04L 67/02* (2013.01); *G06Q 30/0277* (2013.01); *H04L 63/0428* (2013.01); *H04L 67/34* (2013.01)

(58) Field of Classification Search
CPC ..... H04L 67/02; H04L 63/0428; H04L 67/34; G06Q 30/0277
See application file for complete search history.

(56) References Cited

U.S. PATENT DOCUMENTS

| | | | |
|---|---|---|---|
| 9,177,335 B1 | 11/2015 | Carasso | |
| 2011/0131567 A1* | 6/2011 | Tirk | G06Q 30/0242 717/176 |
| 2014/0006924 A1* | 1/2014 | Tsolis | G06F 16/972 715/234 |
| 2016/0253718 A1* | 9/2016 | Carasso | H04L 63/029 705/14.73 |
| 2017/0034210 A1* | 2/2017 | Talmor | H04L 63/1416 |
| 2018/0101507 A1* | 4/2018 | Malca | G06F 40/143 |
| 2018/0137546 A1* | 5/2018 | Kang | G06F 16/9577 |
| 2022/0116481 A1* | 4/2022 | Katta | H04L 67/02 |
| 2022/0334858 A1* | 10/2022 | Cohen | H04L 63/1441 |
| 2024/0314168 A1* | 9/2024 | Cohen | H04L 63/1491 |

FOREIGN PATENT DOCUMENTS

| | | |
|---|---|---|
| KR | 10-2016-0109060 | 9/2016 |
| KR | 10-2019-0083899 | 7/2019 |
| KR | 10-2021-0128446 | 10/2021 |

* cited by examiner

Primary Examiner — Joseph L Greene
(74) Attorney, Agent, or Firm — ASLAN LAW, P.C.

(57) ABSTRACT

An operating method of a server to avoid an advertisement blocking instruction may include: receiving HTTP request from a client; acquiring HTTP response to the HTTP request, which includes first advertisement information ("first AD information"); amending the HTTP response; and transferring the amended HTTP response to the client, wherein the amending the HTTP response includes: encrypting at least one resource of the HTTP response; and inserting a repair script to utilize the HTTP response including the at least one encrypted resource.

10 Claims, 12 Drawing Sheets

[FIG. 1]
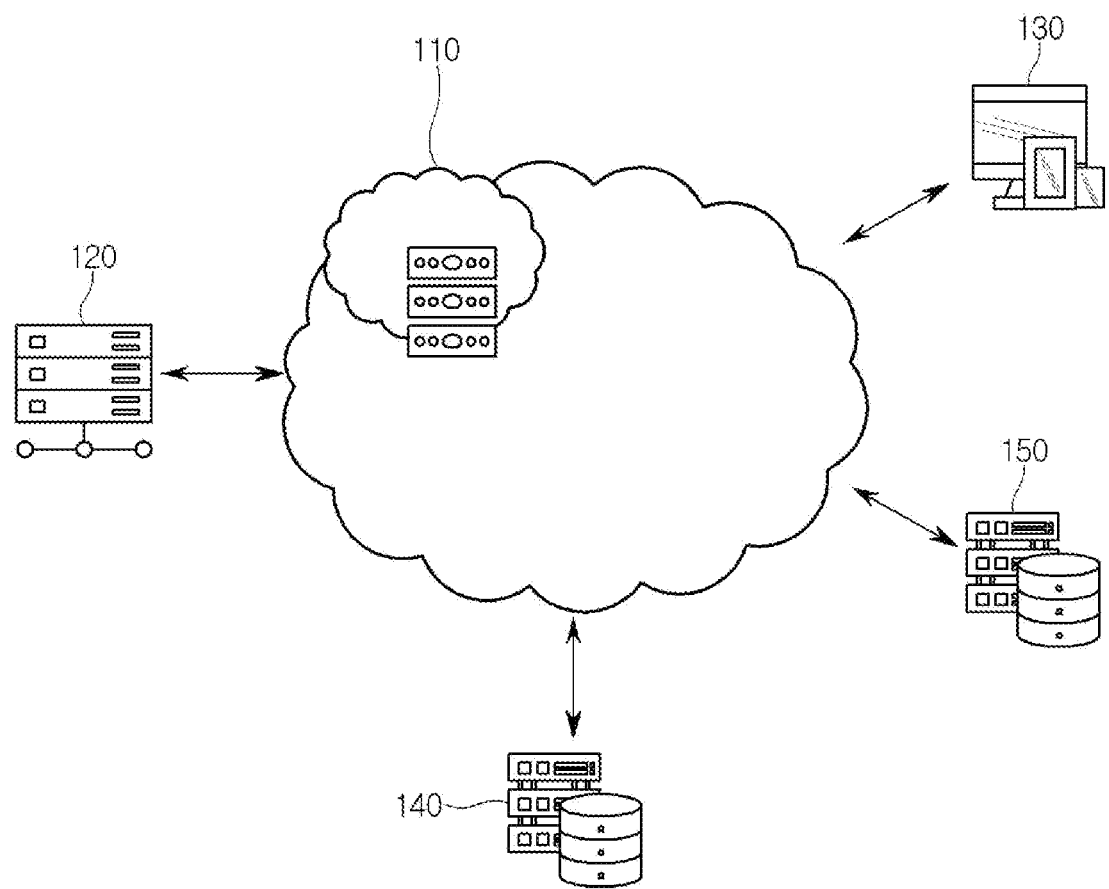

[FIG. 2]
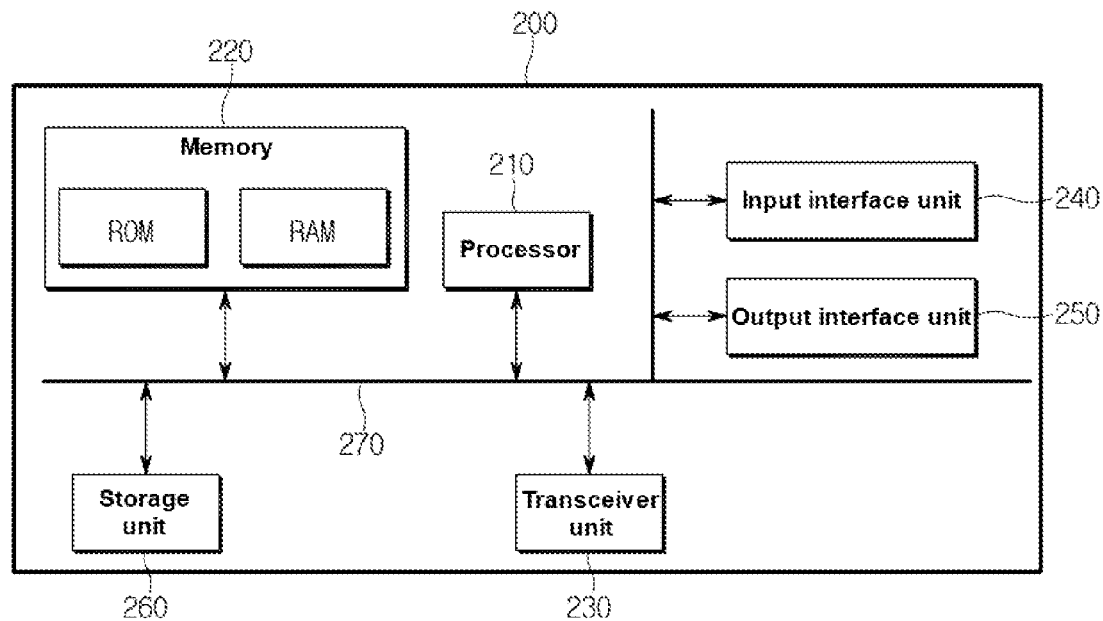
[FIG. 3]
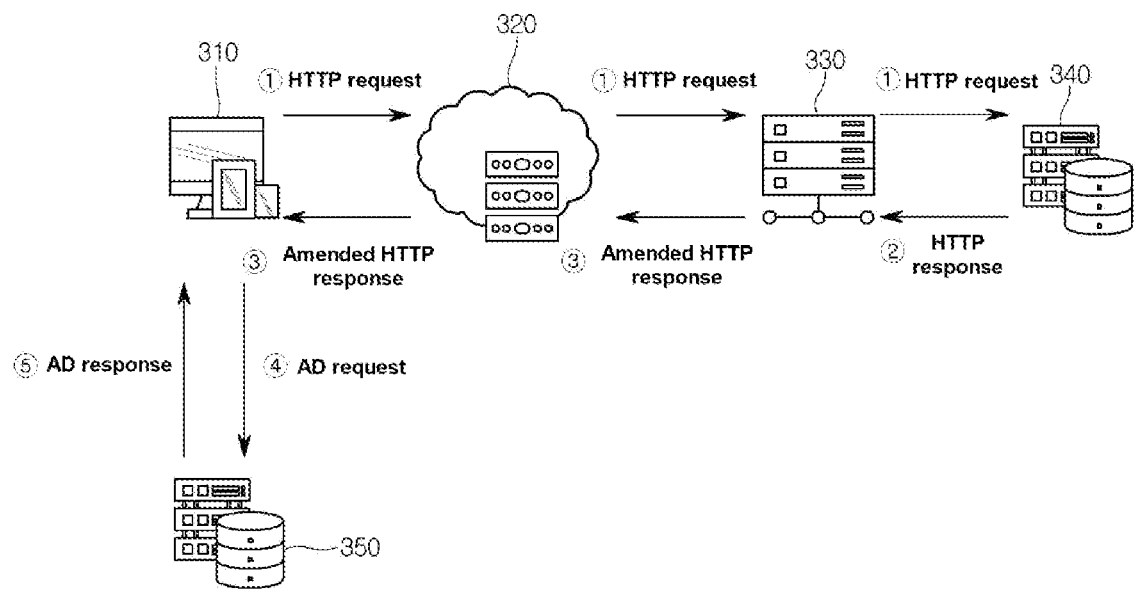

[FIG. 4]
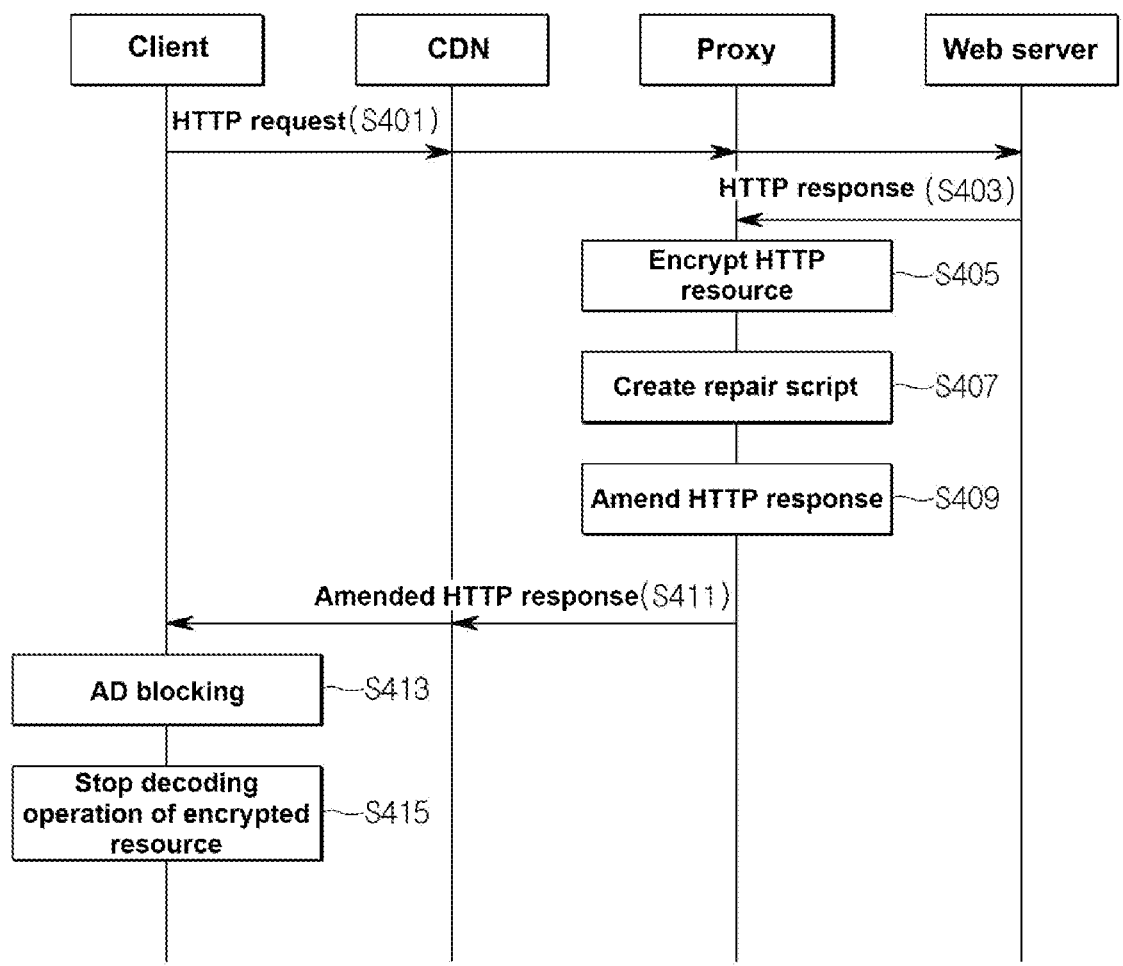

[FIG. 5]
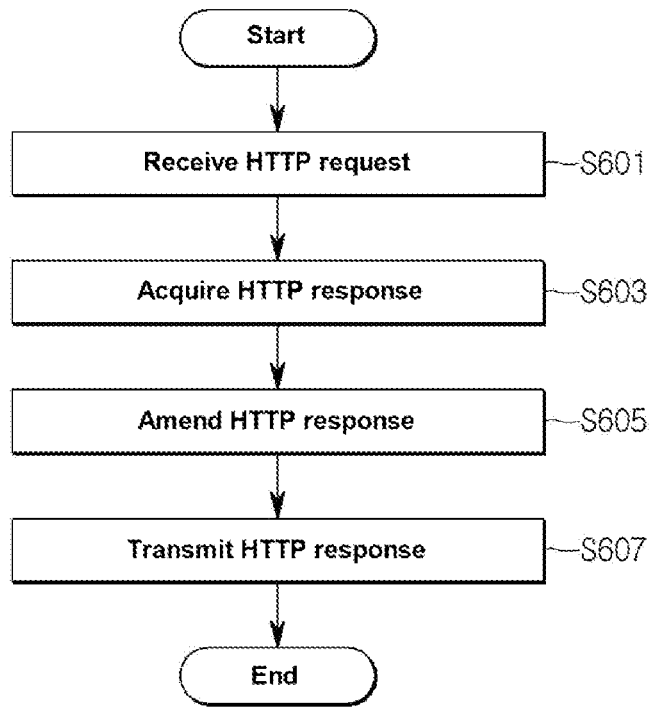
[FIG. 6]
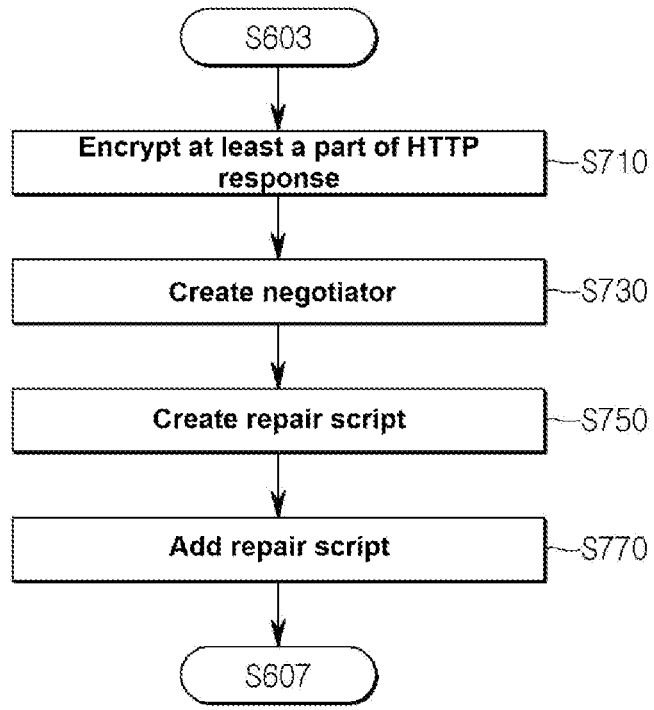

[FIG. 7]
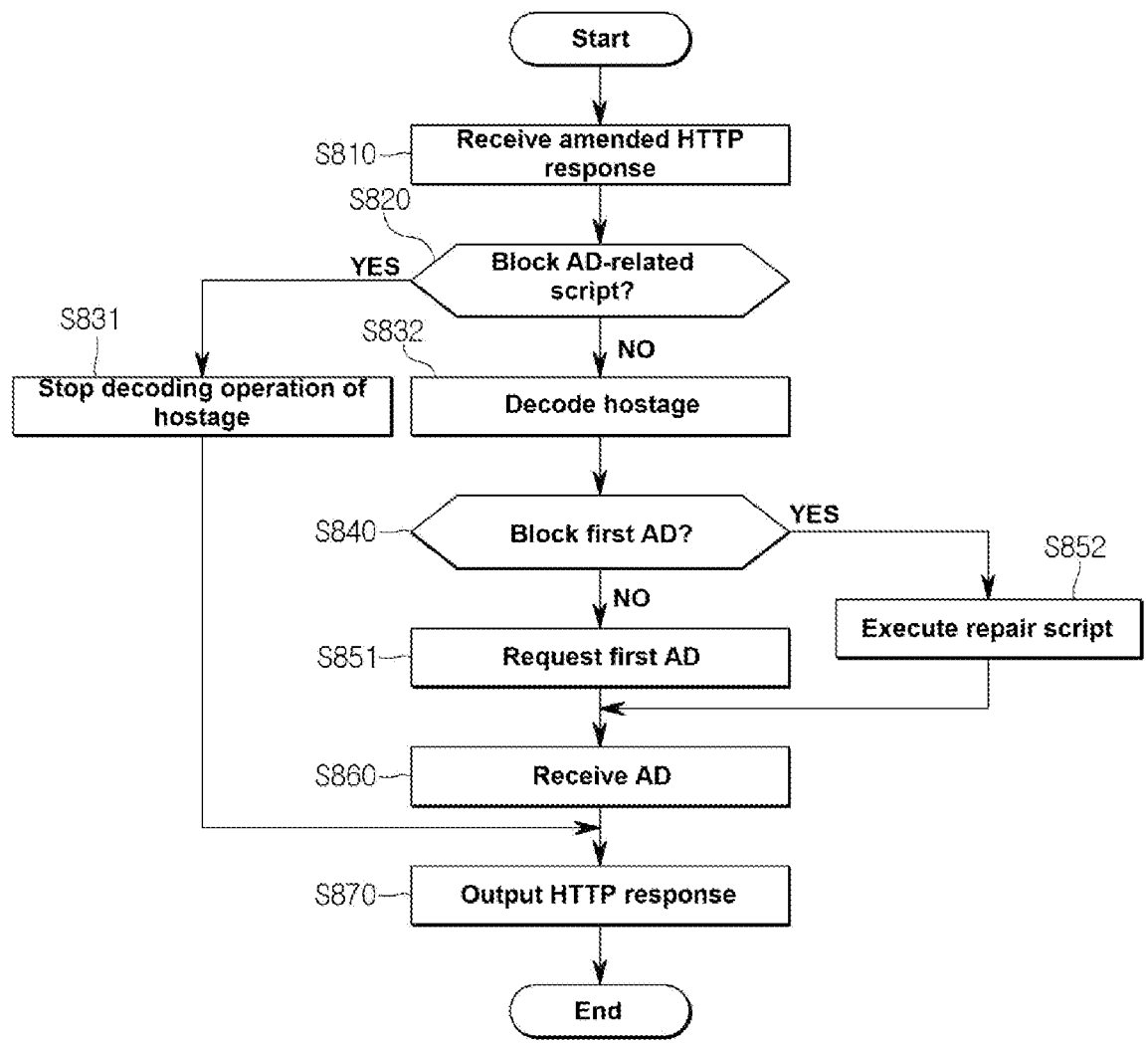

[FIG. 8]
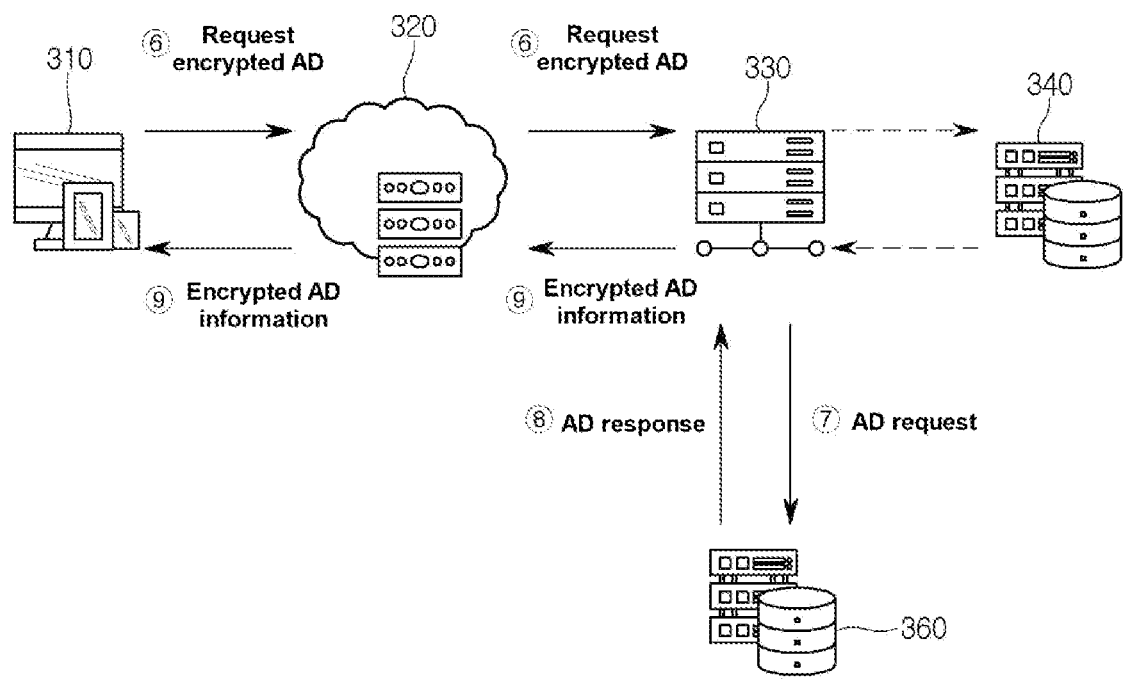
[FIG. 9]
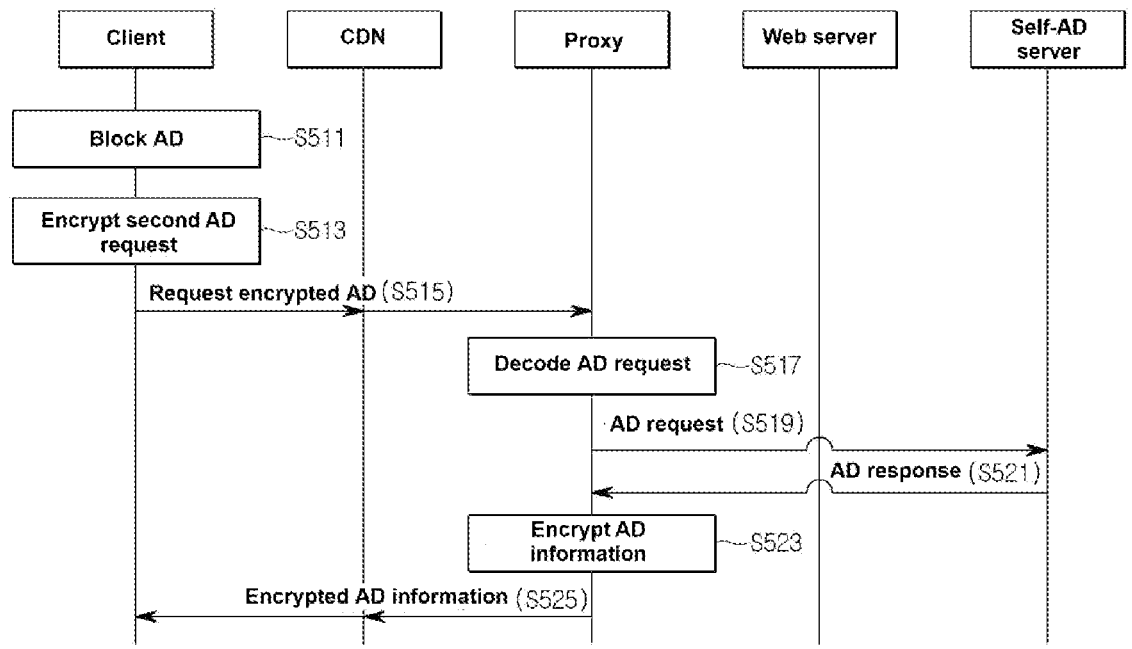

[FIG. 10]
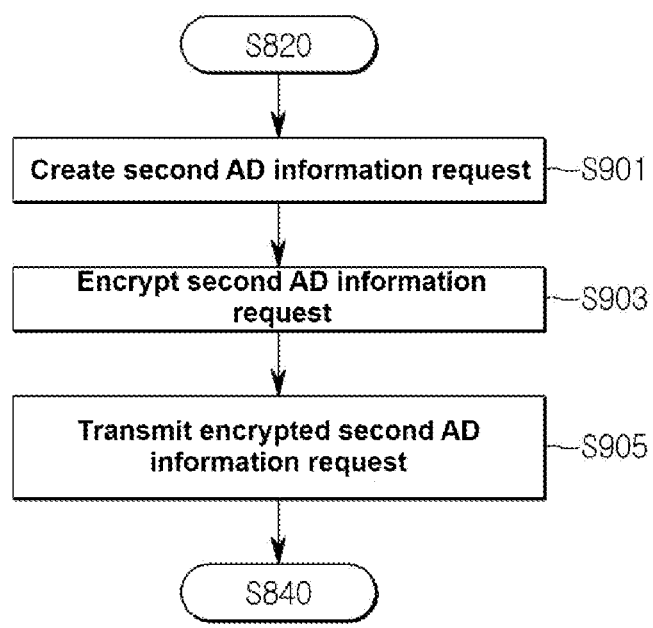

[FIG. 11]
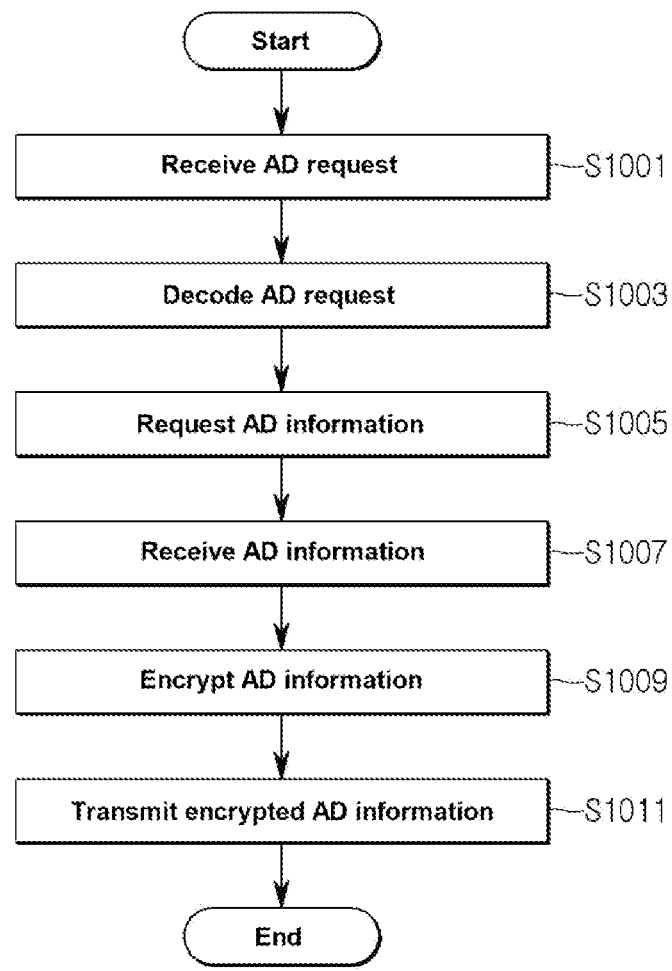

[FIG. 12]
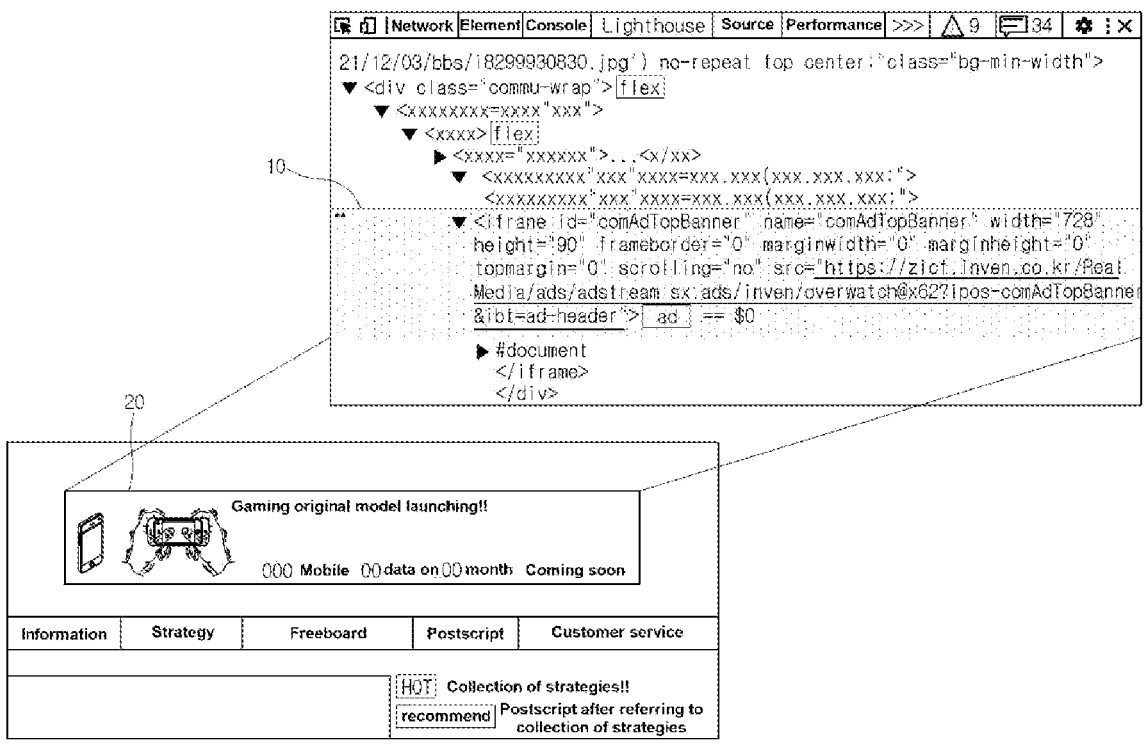

[FIG. 13]
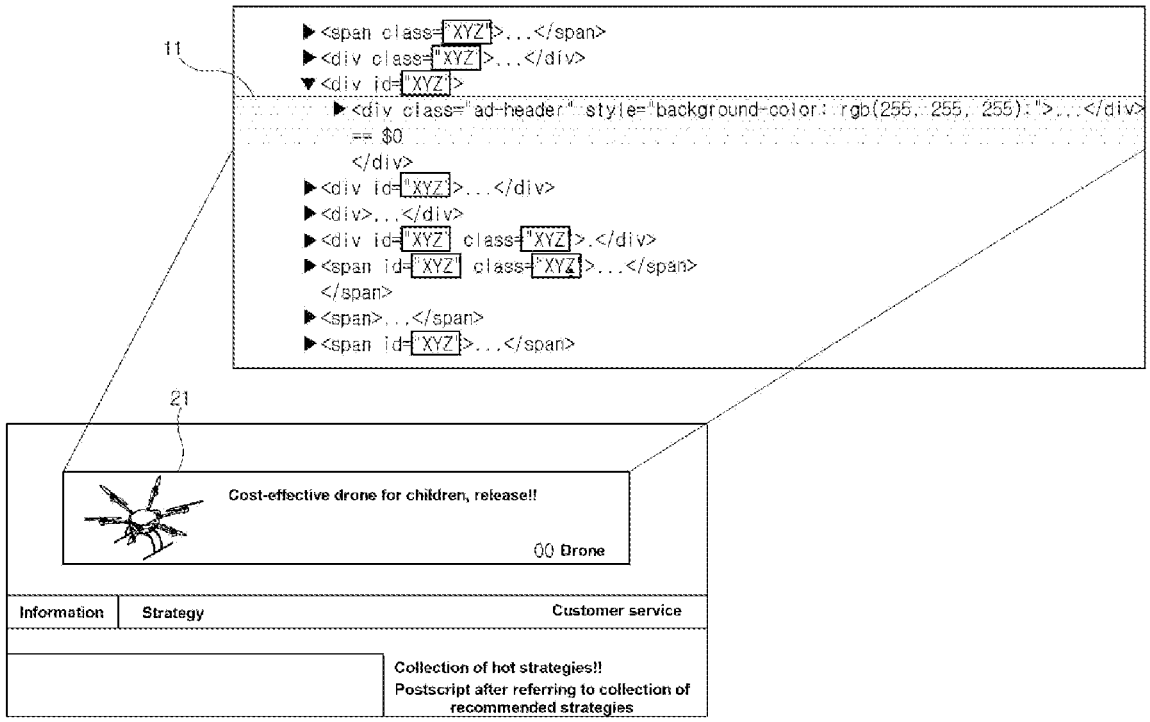
[FIG. 14]

[FIG. 15]
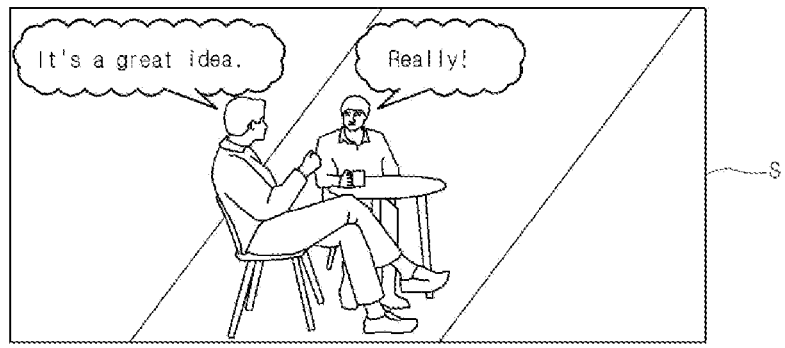
[FIG. 16]

[FIG. 17]
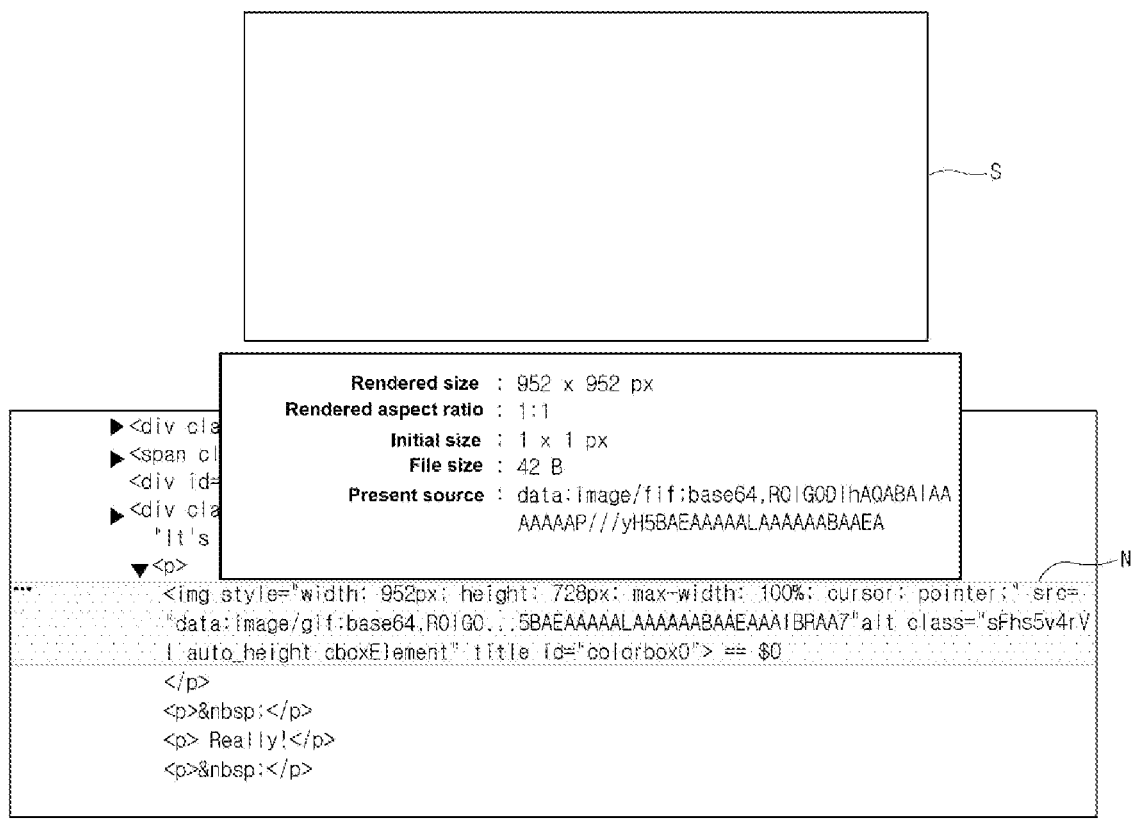

METHOD AND DEVICE FOR PROVIDING ADVERTISEMENT BY COUNTERACTING ON VIOLENT ADVERTISEMENT BLOCKING FUNCTION

CROSS-REFERENCE TO RELATED APPLICATIONS

This application claims priority to KR Patent Application No. 10-2022-0018831 filed on Feb. 14, 2022, and this application claims priority to KR Patent Application No. 10-2022-0018834 filed on Feb. 14, 2022, and this application claims priority to KR Patent Application No. 10-2022-0018838 filed on Feb. 14, 2022, the entire contents of which are hereby incorporated by reference.

TECHNICAL FIELD

The present invention relates to a method and device for providing advertisement, and more specifically, a method for providing advertisement, by inducing a violent advertisement blocker to stop running, in response of advertisement blocking function and a device for implementing above method.

BACKGROUND ART

On-line advertisement is one of important profit sources to contents publishers. Further, on-line advertisement is also one of means for promoting information on diverse products and services.

The on-line advertisement may be output in any form of banner, pop-up, embedded, in-line type, full-page advertisements, and a whole page form, when a user visits the page or leaves the same. The on-line advertisement may be provided in the form of link, audio contents or text, image and/or graphic contents including other multi-media contents.

An advertisement blocker may block on-line advertisements in websites such as HyperText Markup Language (HTML) page and other download-possible contents. The advertisement blocker may be the service operating through software applicable programs, browser components, extension programs, additional functions, script, or the like.

Such an advertisement blocker as described above may deprive advertising earnings invested to a content publisher and prevent marketing or promotion of products and service and provision of information. Accordingly, it is required to compensate or countervail influence of the advertisement blocker, thereby displaying a content containing the advertisement to clients.

DISCLOSURE

Technical Problem

In order to solve the above-described problem, an object of the present invention is to provide a method, device and system for providing advertisement to clients even if an advertisement blocker acts on the clients.

Another object of the present invention to solve the above-described problem is to provide a method, device and system for providing advertisement to clients by making a detour around the advertisement blocker when the advertisement blocker acts on the clients.

Technical Solution

In order to achieve the above objects, an operating method of a server to avoid an advertisement blocking instruction may include: receiving HTTP request from a client; acquiring HTTP response to the HTTP request, which includes first advertisement information ("first AD information"); amending the HTTP response; and transferring the amended HTTP response to the client, Herein, the step of amending the HTTP response may include: encrypting at least one resource of the HTTP response; and inserting a repair script to utilize the HTTP response including the at least one encrypted resource.

Herein, the at least one resource may include one or more among image, script, CSS and HTTP element of the HTTP response.

Herein, the method may further include a step of creating a negotiator including at least one instruction, which is executed by the client, in order to determine whether to encrypt or load the at least one encrypted resource of the HTTP response. The repair script may further include the negotiator.

In this regard, at least one instruction of the repair script may be executed by the client, in order to determine whether an AD blocking operation is executed or not.

Herein, if the AD blocking operation is not executed by the client, the at least one instruction of the repair script may enable at least one instruction of the negotiator to be executed by the client.

In this regard, if the AD blocking operation is executed by the client, the at least one instruction of the repair script may stop execution of at least one instruction of the negotiator by the client or cancels resource loading.

Herein, if the AD blocking operation is executed by the client after exposing the at least one resource, the at least one instruction (of the repair script) may stop execution of at least one instruction of the negotiator by the client and/or cancel resource loading.

In order to achieve the above objects, a computer recording medium including at least one instruction executed by a processor, the at least one instruction may be executed by the processor in order to: receive HTTP request from a client; acquire HTTP response as a response information to the HTTP request, which includes first AD information; amend the HTTP response; and transfer the amended HTTP response to the client.

Herein, in order to amend the HTTP response, the instruction may be executed by the processor to: encrypt at least one resource of the HTTP response; and insert a repair script for utilizing the HTTP response which includes the at least one encrypted resource.

Herein, the at least one resource may include one or more among image, script, CSS and HTML element of the HTTP response.

In this regard, the at least one instruction may be further executed to create a negotiator including at least one instruction executed by the processor of the client, so as to determine whether to decode or load the at least one encrypted resource of the HTTP response, and the repair script may further include the negotiator.

Herein, the repair script may include at least one instruction executed by the processor of the client, and the at least one instruction of the repair script may be executed by the processor of the client in order to determine whether an AD blocking operation is executed or not.

In this regard, if the AD blocking operation is not executed by the processor of the client, the at least one instruction of the repair script may enable at least one instruction of the negotiator to be executed by the processor of the client.

In this regard, if the AD blocking operation is executed by the processor of the client, the at least one instruction of the repair script may stop the execution of the at least one instruction of the negotiator by the processor of the client or cancel resource loading.

Herein, if the AD blocking operation is executed by the processor of the client after exposing the at least one resource, the at least one instruction of the repair script may stop the execution of the at least one instruction of the negotiator by the processor of the client and/or cancel resource loading.

In order to achieve the above objects, an operating method of a client to avoid an advertisement blocking instruction may include: transmitting HTTP request to a server; acquiring HTTP response as a response information to the HTTP request, which includes first AD information, from the server; and outputting the HTTP response. The HTTP response may include: at least one encrypted resource; and a repair script to utilize the HTTP response including the at least one encrypted resource.

Herein, the at least one resource may include one or more among image, script, CSS and HTML element of the HTTP response.

Herein, the repair script further may include a negotiator including at least one instruction executed to determine whether to decode or load the at least one encrypted resource of the HTTP response.

In this regard, if AD blocking function is not performed, at least one instruction of the negotiator may be executed.

In this regard, if AD blocking function is performed, execution of at least one instruction of the negotiator may be stopped or resource loading may be cancelled.

Herein, if AD blocking function is performed after exposing the at least one resource, execution of at least one instruction of the negotiator may be stopped and/or resource loading may be cancelled.

DESCRIPTION OF DRAWINGS

FIG. 1 is a diagram illustrating an embodiment of the configuration of an advertisement ("AD") providing system.

FIG. 2 is an exemplary diagram illustrating a hardware configuration of a device included in the AD providing system shown in FIG. 1.

FIG. 3 is a conceptual diagram illustrating signal flow between separate components of the AD providing system.

FIG. 4 is a flowchart illustrating the operations of the separate components of the AD providing system.

FIG. 5 is a flow diagram illustrating an operation of proxy of the AD providing system.

FIG. 6 is a flow diagram illustrating HTTP response amending operation of proxy of the AD providing system.

FIG. 7 is a flow diagram illustrating an operation of the client in the AD providing system when receiving the amended HTTP response.

FIG. 8 is a conceptual diagram illustrating signal flow between separate components of the AD providing system.

FIG. 9 is a flowchart illustrating the operations of separate components of the AD providing system.

FIG. 10 is a flow diagram illustrating an operation of executing a repair script of the client in the AD providing system.

FIG. 11 is a flow diagram illustrating an operation of proxy of the AD providing system when receiving a request for encrypted advertisement.

FIG. 12 illustrates an embodiment of HTTP response including a field in relation to general advertisement information.

FIG. 13 illustrates an embodiment of HTTP response including obfuscated field in relation to advertisement information in the advertisement providing system.

FIG. 14 illustrates one embodiment of general advertisement request.

FIG. 15 illustrates one embodiment of the encrypted AD request in the AD providing system.

FIG. 16 illustrates one embodiment of a result of the resource loading of the negotiator.

FIG. 17 illustrates one embodiment of a result of stopping the resource loading of the negotiator.

DETAILED DESCRIPTION OF PREFERRED EMBODIMENTS OF INVENTION

The present invention may include addition of various alterations, as well as various embodiments. Hereinafter, specific embodiments of the present invention will be illustrated in the accompanying drawing and described as follows. However, it should be understood that this invention is not intended to be limited to the specific embodiments described herein but includes all of various modifications, equivalents and/or alternatives included in the spirit and technical scope of the present invention.

The expressions such as "first", "second", etc. may describe different components but does not limit these components. These terms are used only to distinguish a component from another component. For example, a first component may also be referred to as a second component, likewise, the second component may also represent the first component without departing the scope of rights of the present invention. Further, the term of "and/or" may include a combination of plural items described in relation to one another or any one of the plural items described in relation to one another.

When any component is described to "be connected to" or "coupled with/to" another component, it should be understood that the former component may be directly connected to or coupled with/to the latter component or another different component may be present therebetween. On the other hand, if it is mentioned that a component is "directly connected to" or "directly coupled with/to" another component, it should be understood that no other component exists between the above two components.

The expressions in the present application are used only for describing particular embodiments but not intended to restrict the present invention. The singular expression may include plural expression unless the context clearly dictates otherwise. In the present application, terms such as "include", "have", etc. may be used to denote the presence of features, numerals, steps, operations, components, parts described in the specification or a combination thereof, however, do not exclude the presence of one or more other features, numerals, steps, operations, components, parts or a combination thereof or possibility of addition thereof.

Unless defined otherwise herein, all expressions used herein, including technical or scientific terms, may have the same meanings as commonly understood by those skilled in the art. The terms defined in typically use dictionaries should be interpreted with the same or similar sense as the contextual meanings of the related art and, unless clearly defined in the present specification, may not be interpreted as ideally or excessively formal meanings.

Hereinafter, preferred embodiments of the present invention will be described in more detail with reference to the accompanying drawings. In order to expedite overall understanding in the following description of the present invention, the same reference numerals are assigned to the same components in the drawings and redundant descriptions thereof will be omitted.

FIG. 1 illustrates an embodiment of the configuration of an advertisement providing system.

Referring to FIG. 1, the advertisement ("AD") providing system may include a content delivery network (CDN) 100, one or more proxies 120, one or more clients 130, one or more web servers 140, and one or more AD servers 150. Separate components of the AD providing system may be connected through internet to execute communication.

CDN 110 may be a data center connected to a network comprising distributed nodes and/or a network comprising nodes. CDN 110 may utilize an internet service provider, a carrier, etc. which hosts the node, server and data center. The content provider may transfer contents or the like to the client 130 by utilizing components of the system including CDN 110.

The proxy 120 may be a network accessible device which is operable independent of the CDN 110, the client 130, the server, etc. According to one embodiment, the proxy 120 may be associated with the web server 140 to execute network access operation. The proxy may be forward proxy or reverse proxy.

The client 130 may be a device having a processor to execute applications for content processing, video rendering or displaying. For example, the client 130 may be at least one among laptop computers, smartphones, tablet PCs and desk-top computer machines. The most general application for content processing, video rendering or displaying is a web browsing application but may also include other applications.

The web server 140 may be a server for hosting and transferring contents. The content may refer to any website, text, document, file, media, application, service or game, which are encoded with digitals and can be transferred through a network. The content may be displayed to the client along with information on advertisement provided by one or more AD servers 150.

The AD server 150 may be a server that hosts and transfers various ADs built in the content of a content publisher. In the case of calling an advertisement when the client 130 receives and processes the content, the AD server 150 may provide AD information capable of being provided to the client 130. The advertisement may be configured in the content, or rendered or displayed in a defined manner.

The devices of the AD providing system may be configured as described later.

FIG. 2 is an exemplary diagram illustrating the hardware construction of the device in the AD providing system as shown in FIG. 1.

Referring to FIG. 2, the device 200 may include at least one processor 210, and a memory 220 for storing instructions indicating that the at least one processor 210 executes at least one step.

In this regard, the at least one processor 210 may refer to a central processing unit (CPU), a graphics processing unit (GPU), or an exclusive processor that executes the methods described in the embodiments of the present invention. The memory 220 and a storage unit 260, respectively, may consist of at least one among a volatile storage medium and a non-volatile storage medium. For example, the memory 220 may consist of at least one among a read only memory (ROM) and a random access memory (RAM).

Further, the device 200 may include a transceiver 230 to execute communication through a wireless network. Further, the device 200 may further include an input interface unit 240, an output interface unit 250, a storage unit 260, or the like. Separate components included in the device 200 may be connected to one another through buses 270 to execute communication therebetween.

Signal flow exchanged between the devices of the AD providing system may be performed as described later.

FIG. 3 is a conceptual diagram illustrating signal flow between separate components in the AD providing system.

Referring to FIG. 3, the AD providing system may include a client 310, CDN 320, a proxy 330, a web server 340 and an AD server 350. Herein, some components of the AD providing system may be omitted.

Referring to FIG. 3, the client 310 in (1) may request HTTP content to the web server 340. The HTTP content request may be executed by calling a specific link or starting any application for loading the content. HTTP content request may be generally transmitted in the form of HTTP GET request along with URL that identifies an address of the web server 340 and the content. HTTP content request may be forwarded to the web server 340 through CDN 320 and/or the proxy 330.

In (2), the web server 340 may transmit HTTP response corresponding to the HTTP content request to the proxy 330. Herein, the HTTP response (or HTTP status) may include HTTP content and AD information for calling advertisement. The AD information may include an address of the AD server 350 and HTML attribute for designating the advertisement.

The proxy 330 may amend at least a part of the HTTP response received from the web server 340. For example, the proxy 330 may amend content, AD information, etc. included in the HTTP response. According to one embodiment, the proxy 330 may execute operations such as encryption and/or obfuscation of the content and/or AD information. More particularly, the proxy 330 may create a plurality of hierarchical tags and attribute values of the tags, respectively, and add the same to a field including the AD information in the HTTP response, thereby enabling obfuscation of at least a partial field of the HTTP response. Specifically, the proxy 330 may create a plurality of hierarchical tags and attribute values of the tags, respectively, and add the same to a field including the AD information in the HTTP response, thereby enabling obfuscation of at least a partial field of the HTTP response.

The proxy 330 may add an instruction such as script to the HTTP response. For example, if at least some information included in the HTTP response is encrypted, the proxy 330 may add at least one instruction in order to decode the at least some information encrypted as above.

Further, in (3), the proxy 330 may transmit the amended HTTP response to the client 310. The amended HTTP response may be forwarded to the client 310 through CDN 320, otherwise, may be directly transmitted without passing through CDN 320. The client 310 requesting HTTP content may receive HTTP response including the HTTP content from the proxy 330 and/or CDN 320. According to one embodiment, the AD blocker may block rendering of AD field and/or AD information using CSS rule.

Further, if the at least some information of HTTP response is encrypted, the client 310 may decode the encrypted information of the HTTP response to perform rendering of content. Herein, the encrypting operation may be performed according to whether AD blocking functions have been performed or not.

If such AD blocking function is not performed by the client 310, the client 310 may execute at least one instruction included in the repair script and decode the encrypted information of the HTTP response. Otherwise, in spite of performing the AD blocking function, if AD-related information is not blocked, the encrypted information of the HTTP response can be decoded by executing the at least one instruction included in the repair script. Accordingly, the client 310 may render the content of the HTTP response.

If the AD-related information included in the HTTP response is blocked by performing the AD blocking function, the decoding operation of the HTTP response by the client 310 may be stopped or eliminated. Accordingly, the client 310 may not perform rendering of the content included in the HTTP response.

In (4), if the AD blocking function is not performed by the client 310, the client 310 may request advertisement to the AD server 350 based on AD information included in the HTTP response. Otherwise, in spite of performing the AD blocking function by the client 310, if the AD-related information is not blocked, the client 310 may request advertisement to the AD server 350 based on AD information included in the HTTP response.

In (5), the client 310 may receive AD response from the AD server 350, and may output advertisement based on the received AD response. Accordingly, the client 310 may successfully call the advertisement.

The operation of devices in the AD providing system owing to signal flow exchanged between the devices may be performed as described later.

FIG. 4 is a flowchart illustrating the operations of separate components of the AD providing system.

Referring to FIG. 4, the AD providing system may include a client, CDN, a proxy, a web server and an AD server. However, some components of the AD providing system may be omitted.

In step S401, the client may transmit HTTP request to the web server. At this time, the HTTP request may be forwarded to the web server through CDN and/or the proxy.

In step S403, the web server may transmit HTTP response corresponding to the HTTP request.

In step S405, the web server may encrypt at least some information of the HTTP response. For example, the web server may encrypt at least a part among HTTP resource included in the HTTP response.

In step S407, the proxy may create a repair script for utilizing at least a partial field of the HTTP response. The repair script may include at least one instruction. Further, the repair script may include a negotiator which is performed to determine whether to decode or load at least a part of the encrypted HTTP response.

In step S409, the proxy may amend the HTTP response. For example, the proxy may delete the existing HTTP resource from the HTTP response, instead, add the encrypted HTTP resource. That is, the proxy may replace the existing HTTP resource of the HTTP response with the encrypted HTTP resource. The proxy may transmit the encrypted HTTP resource to the negotiator. Further, the proxy may add the repair script to the HTTP response.

In step S411, the proxy may transmit the amended HTTP response to the client. In this regard, the amended HTTP response may be forwarded to the client through CDN.

In step S413, the client may perform AD blocking function. If AD-related script included in the HTTP response is not blocked by the AD blocking function of the client, the client may execute the negotiator to decode and load at least a part of the encrypted HTTP response. Further, the client may call AD information included in the HTTP response and output the AD information. Herein, the AD-related script may include a repair script and/or a script of at least a partial field of the HTTP response in which AD-related information is included.

On the other side, if the AD-related script included in the HTTP response is blocked by the AD blocking function of the client, in step S415, the negotiator may stop loading of the HTTP response. That is, the decoding operation to the encrypted HTTP response may be stopped or the loading itself may be stopped, and thus, the client may not load HTTP resource. At this time, the negotiator of the resource may stop the decoding operation, cancel an instruction for resource loading itself, or unload the entire or a part of the already loaded resource.

FIG. 5 is a flow diagram illustrating operation of the proxy of the AD providing system.

In step S601, the proxy may receive HTTP request from the client.

In step S603, the proxy may request a content corresponding to the HTTP request to an outside server, and may acquire HTTP response corresponding to the HTTP request from the outside server. At this time, the HTTP response may include first AD information. The first AD information may include information and/or script for calling the first AD. For example, the information for calling the first AD may be an address such as URL, URI, etc. in order to call advertisement to an AD server.

In step S605, the proxy may amend the HTTP response received from the outside server. Specifically, the proxy may insert at least a script and/or instruction to avoid the AD blocker of the client into the HTTP response. The operation of the proxy to amend HTTP response may be performed as described later.

FIG. 6 is a flow diagram illustrating operation of amending HTTP response of the proxy of the AD providing system.

In step S710, the proxy may encrypt at least a part of the HTTP response. For example, the proxy may create an encryption key based on HTTP request and/or HTTP response. Further, the proxy may encrypt at least a part of the HTTP resource including contents such as image, script, CSS, HTTP elements included in the HTTP response. For example, the proxy having the encryption key created therein may encrypt at least a part of the HTTP response using the encryption key. Herein, the at least part of the HTTP response encrypted by the proxy may be referred to as "hostage".

In step S730, the proxy may create a negotiator to determine whether to decode or load at least one resource of the above encrypted HTTP response. In order to decode at least a part of the encrypted HTTP response, the negotiator may include at least one instruction executed by the client. The negotiator may include a decoding key to decode at least a part of the encrypted HTTP response. The instruction and decoding key may be called "key factors". That is, the negotiator may include a key factor, wherein the key factor can determine at least one among whether to decode the encrypted HTTP response, whether to load a resource, and whether to unload the already loaded resource, according to activation or not of an AD blocker.

In step S750, the proxy may create a repair script for utilizing at least a partial field of the HTTP response. The repair script may include a negotiator. Further, the repair script may include at least an instruction for utilizing the at least partial field of the HTTP response. In this regard, the at least partial field may be a field including a script in relation to the first AD information included in the HTTP response that was received from the outside server, or the like. At least an instruction of the repair script may be executed by the client.

The repair script may include an instruction executed to determine whether AD blocking function is performed by the client. Further, when the calling of the first AD included in the HTTP response is blocked by the client, the repair script may include an instruction which is executed to conduct encryption of information for requesting alternative advertisement, and then transmit the encrypted AD requesting information. In order to determine whether AD blocking function is performed or not, a method of adding a field including often blocked AD information to the amended HTTP response may be utilized. As such, providing blocking-possible clues through known functions of the AD blocker may be sufficient in order to determine whether to perform AD blocking function or not.

Further, the repair script may include a negotiator including an instruction executed in order to determine whether to load a resource. For example, in the case where an AD blocking operation is performed by the client, the negotiator may execute an instruction to stop loading of a resource, which was required to be displayed to the client, or to unload the already loaded resource.

In step S770, the proxy may add a repair script to the HTTP response. Accordingly, the HTTP response amended by the proxy may include a negotiator for decoding at least some information of the encrypted HTTP response and the repair script for utilizing at least a partial field of the HTTP response.

The sequential order of several steps listed in FIG. 6 was proposed only as an illustrative example, and the order of individual steps may be altered and applied. For example, after creating a repair script firstly, a negotiator may be inserted in the repair script. Alternatively, after creating a negotiator and a repair script, both of them may be inserted in the HTTP response, followed by encryption thereof.

In another embodiment, the proxy may create a plurality of hierarchical tags and attribute values of the tags, respectively. At this time, the plurality of hierarchical tags and attribute values may be randomly created for each HTTP request. A hierarchical tag independent of output of the HTTP response including AD information may be named dummy tag.

In addition, the proxy may add the dummy tag to the HTTP response so as to obfuscate at least a partial field of the HTTP response. At this time, the at least partial field may be a field including a script in relation to the first AD information included in the HTTP response that was received from the outside server. Further, the at least partial field may include at least an instruction and/or script for calling second AD from a self-advertisement server.

In other words, the proxy may add the dummy tag to the HTTP response so as to obfuscate a field including a script in relation to the first AD information and/or an instruction or the like for calling the second AD. The dummy tag may be information independent of an operation to output the first AD information executed by the client. Herein, at least a partial field may be named an advertisement calling field including a dummy tag, information on first AD and/or second AD, etc.

However, the amended HTTP response may not include the dummy tag and/or repair script, and it is obviously understood that additional construction to ensure utility of at least a partial field may further be included.

Again referring to FIG. 5, in step S607, the proxy may transmit the amended HTTP response. According to one embodiment, the amended HTTP response may include an encrypted hostage and/or a repair script for utilizing at least a partial field of the HTTP response including the hostage. In another embodiment, the amended HTTP response may include a field of the first advertisement information.

The client may receive the amended HTTP response from the proxy. The operation of the client having received the amended HTTP response may be performed as described later.

FIG. 7 is a flow diagram illustrating the operation of the client of the AD providing system that received the amended HTTP response.

In step S810, the client may receive the amended HTTP response from the proxy.

The AD blocker of the client having received the amended HTTP response may perform AD blocking function. In step S820, the client may determine whether the AD-related script was blocked or not by the AD blocker. Herein, the client may further determine whether the repair script was deleted or not by the AD blocker. Otherwise, the client may determine whether at least a parital field of HTTP response including AD information was deleted by the AD blocker.

If the AD-related script is blocked by the AD blocker, in step S831, the client may stop an operation of executing at least one instruction of the negotiator by executing an instruction of the repair script. Therefore, an operation of the client for decoding an encrypted hostage and loading a resource may not be performed. Herein, the step S831 was illustrated as stopping the decoding operation of the hostage, however, it may be a step of cancelling the loading of the hostage itself. That is, if the AD-related script is blocked, an operation for completely limiting hostage loading, in which the already loaded resource is eliminated (or unloaded) like that the HTTP response was not loaded from the first, may also be included, in addition to stopping the decoding and loading of the hostage to prevent the HTTP response from being displayed to the client, or may replace the existing operation. Such a resource unloading logic may also be applied after proceeding step S832.

If the AD-related script is not blocked by the AD blocker, in step S832, the client may execute at least one instruction of the negotiator. Accordingly, an operation of the client for decoding the encrypted hostage and loading the resource may be performed.

However, when the AD-related script is blocked by the AD blocker after the client decodes the hostage and loads at least one HTTP resource, the client may stop an operation of executing at least one instruction of the negotiator by executing an instruction of the repair script. Further, the client may set back the calling of a resource by executing the instruction of the repair script. That is, executing at least one instruction of the negotiator by the client may be stopped, and HTTP resource loading may be foundered. As a result, the HTTP resource may not be loaded.

In step S840, the client may determine whether the first AD information included in the amended HTTP response was blocked or not.

If the first AD information included in the amended HTTP response is not blocked, in step S851, the client may transmit a request for the first advertisement ("first AD request") based on information on the first AD request to the AD server.

Meanwhile, when the first AD information included in the amended HTTP response is blocked, in step S852, the client may execute at least an instruction of the repair script. In other words, the client may replace the first AD information included in the amended HTTP response and, in order to utilize a partial field of the HTTP response in relation to AD information, may execute at least an instruction of the repair script.

In step S860, the client may receive AD information corresponding to AD request from the AD server. When the client did not block the first AD information included in the amended HTTP response, the client may receive a first advertisement from the AD server. When the client blocked the first AD information included in the amended HTTP response, the client may receive a second advertisement provided by the self-AD server from the proxy.

In this regard, the second AD received from the proxy may be encrypted information. The client having received the encrypted second AD may execute at least an instruction of the repair script, thereby decoding the second AD.

In step S870, regardless of whether the hostage was decoded or the decoding operation was stopped, HTTP response may be output. If hostage decoding is stopped or resource calling is cancelled or unloaded after passing the step S831, the web page may not be displayed normally. When the hostage is decoded after passing the step S832 and first AD is not blocked in step S840, an advertisement and a web page originally desired by the publisher may be output when outputting the HTTP response. When the hostage is decoded after passing the step S832 but the first AD is blocked and thus the repair script is performed after passing step S852, second AD (transmitted from a self-AD server) and the web page of the publisher may be output.

The repair script including a negotiator may consistently monitor an AD blocker at the client side even when the hostage is decoded to thus load a response resource. For example, in the case where neither the first AD nor the second AD could be output by a violent AD blocker until HTTP response is output (S870) although the hostage was decoded after passing the step S832, the negotiator may set back the already called resources or replace the same with other information (images, etc.), thereby outputting alternative HTTP response display different from the HTTP response required to be displayed by the client.

In this regard, the client executing at least an instruction of the repair script in the AD providing system, as well as signal flow between components of the AD providing system may be described as follows.

FIG. 8 is a conceptual diagram illustrating signal flow between separate components of the AD providing system.

Referring to FIG. 8, the AD providing system may include a client 310, CDN 320, a proxy 330, a web server 340, and an AD server 360. However, some components of the AD providing system may be omitted. Further, the signal flow in FIG. 8 may be a signal flow following the signal flow shown in FIG. 3.

Referring to FIG. 8, the client 310 in (6) may request an additional advertisement to the proxy server 330. The additional AD request may include an address of the AD server 360 that provides the additional AD, and HTML, attribute or the like in order to designate the additional AD. According to one embodiment, the client 310 may encrypt the additional AD request to avoid AD call blocking, and then may transmit the encrypted additional AD request to the proxy 330. The additional AD request may be forwarded to the proxy 330 through CDN 320.

In (7), the proxy 330 may request AD information to the AD server 360 corresponding to the received AD request. In (8), the proxy 330 may receive the AD information from the AD server 360. In this regard, the AD server shown in FIG. 8 may be a server managed by an operating owner of the AD providing service according to the present disclosure. Hereinafter, the AD server 360 shown in FIG. 8 may be named a "self-AD server 360".

Further, in (9), the proxy 330 may transmit AD information received from the self-AD server 360 to the client 310. At this time, the AD information may be encrypted by the proxy 330 and then transmitted to the client 310.

In (9), the client 310 may receive additional AD information from the proxy 330 and/or the CDN 320. Further, the client 310 may output the received advertisement. Herein, if the AD information is encrypted, the client 310 may decode the received advertisement and then output the same.

That is, referring to FIG. 4, the client 310 may exchange AD request and AD response with the self-AD server 360, therefore, the client needs not to exchange any alternative signal with the web server 340 in order to acquire additional advertisement.

In this regard, separate operations of the devices in the AD providing system owing to the signal flow exchanged between the client 310 that executes at least an instruction of the repair script and the components of the AD providing system may be performed as described later.

FIG. 9 is a flowchart illustrating the operations of separate components of the AD providing system.

Referring to FIG. 9, the AD providing system may include a client, CDN, a proxy, a web server, and an AD server. However, some components of the AD providing system may be omitted.

In step S511, the client may perform AD blocking function. When an advertisement included in HTTP response is blocked by the AD blocking function of the client, the client may execute at least an instruction included in a repair script of the amended HTTP response.

In step S513, the client may create an AD request in order to request alternative advertisement, and then, may encrypt the created AD request.

In step S515, the client may transmit the encrypted AD request to the proxy. Herein, the encrypted AD request may be forwarded to the proxy through CDN.

In step S517, the proxy may decode the encrypted AD request received from the client.

In step S519, the proxy may request an advertisement to a self-AD server corresponding to the decoded AD request.

In step S521, an outside AD server may transmit AD information corresponding to the AD request to the proxy. The AD information transmitted by the self-AD server may be an advertisement content itself. That is, the self-AD server may be a subject to be displayed on the client, such as images, texts, audio contents, etc. of the AD content.

In step S523, the proxy may encrypt the AD information acquired from the outside server.

In step S525, the proxy may transmit the encrypted AD information to the client. Herein, the encrypted AD information may be forwarded to the client through CDN.

As a result, the client may receive the encrypted AD information. The amended HTTP response and/or repair script may include a field indicated to display encrypted AD contents. The client may execute at least an instruction of the repair script so as to decode the encrypted AD information.

Therefore, the client may output the decoded AD information.

In this regard, the operations of separate components of the AD providing system including the client that executes the at least one instruction of the repair script may be performed as described later.

FIG. 10 is a flow diagram illustrating the operation of executing the repair script of the client in the AD providing system.

In step S901, the client having blocked first AD information may create a request for second AD information ("second AD information request"). At this time, the second AD information may be an alternative advertisement independent of the first AD information. Further, an AD server to manage the second AD may be a self-AD server managed by an operating owner of AD providing service and may be an alternative server independent of the AD server managing the first AD.

In step S903, the client may encrypt the second AD information request created by the client. The client may encrypt a second AD request so as to amend at least some information among a domain of the AD request, a request method and a request address. For example, the client may amend the domain of the second AD request into a domain of the server that transmitted the HTTP response. Therefore, the domain of the second AD request may be the same as the domain of the server that transmitted the HTTP response.

In step S905, the client may transmit the encrypted second AD information request to the proxy. When the client performing AD blocking function requests AD information to an outside AD server, the AD information request may be blocked by the AD blocking function of the client. On the other hand, the encrypted AD request may avoid the AD blocking function of the client. As a result, the encrypted AD request may be transmitted to the outside server such as the proxy.

FIG. 11 is a flow diagram illustrating the operation of the proxy of the AD providing system that received the encrypted AD request.

In step S1001, the proxy may receive AD request from the client. In this regard, the AD request may be AD request encrypted by the client. The encrypted AD information may be transmitted in the form of HTTP request, wherein a request method of the HTTP request may be POST.

In step S1003, the proxy may decode the encrypted AD request.

In step S1005, the proxy may request AD information corresponding to the decoded AD request to an outside server. The outside server may be a self-AD server connected to the proxy through a network such as internet.

In step S1007, the proxy may acquire the AD information from the outside server. At this time, the AD information acquired from the outside server may be information in the form of HTTP contents.

In step S1009, the proxy may encrypt the AD information acquired from the outside server.

In step S1011, the proxy may transmit the encrypted AD information to the client. The encrypted AD information may be transmitted in the form of HTTP response, wherein a request method of the HTTP response may be POST. Further, the encrypted AD information may be transmitted in the form of data included in a body of the HTTP response.

With regard to HTTP response including a field in relation to general AD information, as well as the HTTP response including obfuscated field in relation to AD information, embodiments may be described as follows.

FIG. 12 illustrates one embodiment of HTTP response including a field in relation to general advertisement information, and FIG. 13 illustrates one embodiment of HTTP response including obfuscated field in relation to AD information in the AD providing system.

Referring to FIGS. 12 and 13, the HTTP response may include information on fields for rendering at least one content. In this case, some of the fields for rendering the contents may be each field for rendering AD information. Further, information on the fields for rendering contents may include at least a tag for specifying the field, an attribute value of the tag, and information for calling the contents.

Referring to FIG. 12, the field in relation to the general AD information in the HTTP response may include super tags having specific attribute values, an attribute value of a field for outputting AD information, and information such as an address required for calling the AD information.

Specifically, the field including AD information in the HTTP response may be specified by at least one among style information, script information, id and attribute information of iframe, and class information of division and section of the field for outputting AD information.

On the other hand, referring to FIG. 13, the obfuscated field in relation to the AD information of the HTTP response may further include a plurality of tags, and attribute values provided to the tags, respectively. At this time, some of the plurality of tags may be added as sub-hierarchical. Further, the plurality of tags may be overlapped.

Further, the attribute value provided to each tag may not indicate any specific information. That is, the attribute value provided to each tag may be any value independent of the attribute for outputting AD information.

In this regard, at least one among type, arrangement, and structure of the plurality of tags may be differently determined for every HTTP requests. Further, the attribute value provided to each tag may be differently determined for every HTTP requests.

FIG. 14 illustrates one embodiment of general advertisement request, and FIG. 15 illustrates one embodiment of the encrypted AD request in the AD providing system.

Referring to FIGS. 14 and 15, the AD request may include information of request URLs, request methods, state codes, remote address, and referrer policy. The request URL may indicate address to request advertisement, etc. The request method may indicate purpose and type of the request which is transferred by the client. The remote address may indicate address of remote proxy. The referrer policy may indicate policy of referrer remaining when visiting a web site through a hyperlink.

Referring to FIG. 14, the request URL of a general advertisement request may be an address and/or URL of an advertisement server that provides advertisement information. In addition, the request method may be GET, which is a method capable of requesting resources and/or data on the external server side in the form of a URL.

On the other hand, referring to FIG. 15, in the case of an encrypted advertisement request, the domain of the request URL may be an address and/or URL of a web server requesting HTTP content. In addition, the request method may be POST, which is a method capable of requesting resources and/or data from an external server in the form of media or the like, not in the form of a URL.

With regard to the AD providing method of the present invention, one embodiment of a result of operation of the negotiator to induce stopping of performance of AD blocking function are described as follows.

FIG. 16 illustrates one embodiment of a result of operation when the negotiator determined to display HTTP resource (S), FIG. 17 illustrates one embodiment of a result of stopping the operation when the negotiator determined not to display the HTTP resource (S).

Referring to FIGS. 16 and 17, the amended HTTP AD response (N) including AD-related script, or the like may be performed by the client, thereby displaying the HTTP resource (S) or the like.

Referring to FIG. 16, if the negotiator determined to display HTTP resource (S), a hostage may be loaded. Therefore, the HTTP resource (S) of a web site may be successfully displayed to the client.

On the other hand, referring to FIG. 17, if the negotiator determined not to display HTTP resource (S), hostage loading is stopped, and the HTTP resource (S) of a web site may not be displayed to the client. Accordingly, a user of the client may feel inconvenience in using the web site and thus stop use of the AD blocker.

Further, if the negotiator determined not to display HTTP resource (S), hostage loading is stopped and actions to the resource originally required to be displayed may be determined diversely. That is, the HTTP resource (S) itself may be set not to be displayed. Otherwise, as illustrated in FIG. 17, the HTTP resource (S) originally required to be displayed to the client may be replaced with an alternative resource having an intrinsic size of 1×1 px and a rendered aspect ratio of 1:1 to be displayed.

The methods according to the present invention may be embodied in the form of a program instruction performed through a variety of computer means and then be recorded on a computer-readable medium. The computer-readable medium may include program instruction, data file, data structure, etc. alone or in combination thereof. The program instruction recorded on the computer-readable medium may be specially designed and configured, or may be any one known to those skilled in software application and useable thereby.

Examples of the computer-readable medium may include hardware units particularly configured to store and execute the program instruction, such as ROM, RAM, flash memory, etc. Examples of the program instruction may not only include a machine language code that is prepared by a compiler but also a high level language code that can be implemented by a computer using interpreter or the like. The above hardware unit may be configured to be operated as at least one software module in order to execute the operation of the present invention, or vice versa.

As such, the present invention has been described with reference to the embodiments, however, it could be understood that those skilled in the art to which the present invention pertains can variously alter and modify the present invention within a range not departing from the spirit and scope of the present invention described in the following claims.

The invention claimed is:

1. An operating method of a server to avoid an advertisement blocking instruction, comprising:
  receiving Hypertext Transfer Protocol (HTTP) request from a client;
  acquiring HTTP response to the HTTP request, which includes first advertisement information ("first AD information");
  amending the HTTP response; and
  transferring the amended HTTP response to the client,
  wherein the step of amending the HTTP response includes:
    encrypting at least one resource of the HTTP response;
    creating a negotiator including at least one instruction, which is executed by the client, in order to determine whether to decode or load the at least one encrypted resource of the HTTP response; and
    inserting a repair script including the negotiator and at least one instruction, which is executed by the client into the response, in order to utilize the HTTP response including the at least one encrypted resource,
  wherein at least one instruction of the repair script is executed by the client, in order to determine whether an AD blocking operation is executed or not,
  wherein, if the AD blocking operation is not executed by the client, the at least one instruction of the repair script enables at least one instruction of the negotiator to be executed by the client,
  wherein, if the AD blocking operation is executed by the client, the at least one instruction of the repair script is executed to receive a second advertisement information ("second AD information") other than the first AD information, and
  wherein, if the AD blocking operation is still executed by the client after receiving the second AD information, the at least one instruction of the repair script stops execution of at least one instruction of the negotiator by the client and cancels loading a resource or replaces the resource with an alternative resource,
  wherein the repair script including the negotiator is configured to consistently monitor whether the AD blocking operation is performed and, when the AD blocking operation is detected after loading the resource, the negotiator sets back already-called resources or replaces the resource with other information, thereby outputting the alternative resource, and
  wherein the HTTP response includes one or more dummy tags to obfuscate at least a partial field of the HTTP responses, the atleast a partial field including at least an instruction and/or script for calling the second AD information.

2. The method according to claim 1, wherein the at least one resource includes one or more among image, script, CSS and HTTP element of the HTTP response.

3. The method according to claim 1, wherein,
  if the AD blocking operation is executed by the client after exposing the at least one resource,
  the at least one instruction (of the repair script) stops execution of at least one instruction of the negotiator by the client and/or cancels resource loading.

4. A non-transitory computer readable medium including at least one instruction executed by a processor,
  wherein the at least one instruction is executed by the processor in order to:
    receive Hypertext Transfer Protocol (HTTP) request from a client;
    acquire HTTP response as a response information to the HTTP request, which includes first AD information;
    amend the HTTP response; and
    transfer the amended HTTP response to the client,
  wherein, in order to amend the HTTP response, the instruction is executed by the processor to:
    encrypt at least one resource of the HTTP response;
    create a negotiator including at least one instruction, which is executed by the client, in order to determine whether to decode or load the at least one encrypted resource of the HTTP response; and
    insert a repair script including the negotiator and at least one instruction, which is executed by the client into the response, in order to utilize the HTTP response including the at least one encrypted resource, wherein at least one instruction of the repair script is executed by the client, in order to determine whether an AD blocking operation is executed or not, wherein, if the AD blocking operation is not executed by the client, the at least one instruction of the repair script enables at least one instruction of the negotiator to be executed by the client, wherein, if the AD blocking operation is executed by the client, the at least one instruction of the repair script is executed to receive a second AD information other than the first AD information, wherein, if the AD blocking operation is still performed after receiving the second AD information, the at least one instruction of the repair script stops execution of at least one instruction of the negotiator by the client and cancels resource loading or replaces the resource with an alternative resource, wherein the repair script including the negotiator is configured to consistently monitor whether the AD blocking operation is performed and, when the AD blocking operation is detected after loading the resource, the negotiator sets back already-called resources or replaces the resource with other information, thereby outputting the alternative resource, and wherein the HTTP response includes one or more dummy tags to obfuscate at least a partial field of the HTTP response, the at least a partial field including at least an instruction and/or script for calling the second AD information.

5. The non-transitory computer readable medium according to claim 4, wherein the at least one resource includes one or more among image, script, CSS and HTML element of the HTTP response.

6. The non-transitory computer readable medium according to claim 4, wherein, if the AD blocking operation is executed by the processor of the client, the at least one instruction of the repair script stops the execution of the at least one instruction of the negotiator by the processor of the client or cancels resource loading.

7. The non-transitory computer readable medium according to claim 4, wherein, if the AD blocking operation is executed by the processor of the client after exposing the at least one resource, the at least one instruction of the repair script stops the execution of the at least one instruction of the negotiator by the processor of the client and/or cancels resource loading.

8. An operating method of a client to avoid an advertisement blocking instruction, comprising:

transmitting Hypertext Transfer Protocol (HTTP) request to a server;

acquiring HTTP response as a response information to the HTTP request, which includes first AD information, from the server; and outputting the HTTP response, wherein the HTTP response includes:
at least one encrypted resource;
a repair script to utilize the HTTP response including the at least one encrypted resource; and
a negotiator including at least one instruction executed to determine whether to decode or load the at least one encrypted resource of the HTTP response, wherein at least one instruction of the repair script is executed by the client, in order to determine whether an AD blocking function is executed or not, wherein, if AD blocking function is not performed, at least one instruction of the negotiator is executed, wherein, if AD blocking function is performed, the client receives a second AD information other than the first AD information, wherein, if the AD blocking operation is still performed after receiving the second AD information, execution of at least one instruction of the negotiator is stopped or resource loading is cancelled or already loaded resource is unloaded, wherein the repair script including the negotiator is configured to consistently monitor whether the AD blocking operation is performed and when the AD blocking operation is detected after loading the resources, the negotiator sets back already-called resources or replaces the resource with other information, thereby outputting the alternative resource, and wherein the HTTP response includes one or more dummy tags to obfuscate at least a partial field of the HTTP response, the at least a partial field including at least an instruction and/or script for calling the second AD information.

9. The method according to claim 8, wherein the at least one resource includes one or more among image, script, CSS and HTML element of the HTTP response.

10. The method according to claim 8, wherein, if AD blocking function is performed after exposing the at least one resource, execution of at least one instruction of the negotiator is stopped and/or resource loading is cancelled.

* * * * *